Figure 2:
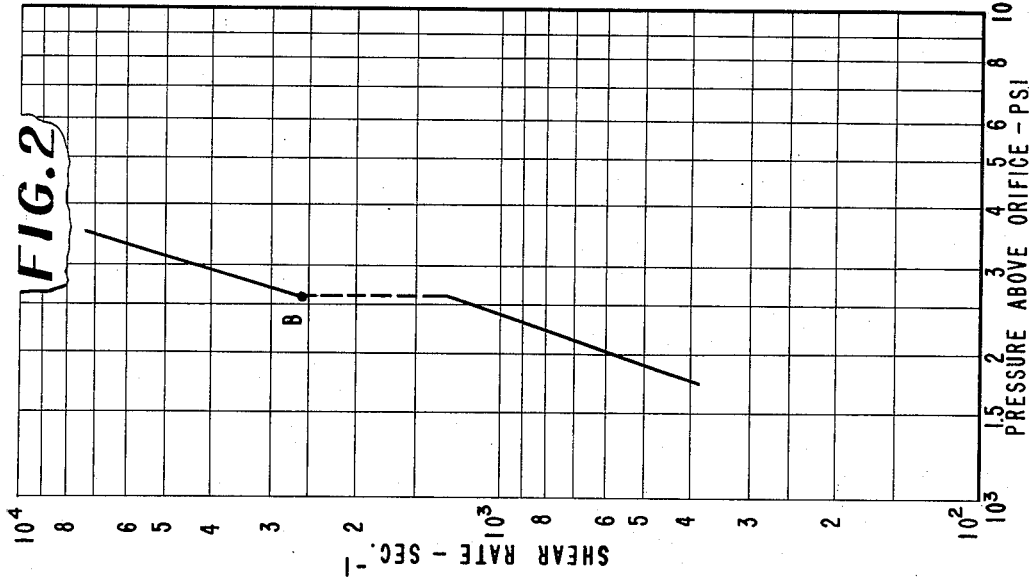

July 11, 1961 R. T. FIELDS ET AL 2,991,508
FABRICATION OF THERMOPLASTIC RESINS
Filed Sept. 23, 1959 2 Sheets-Sheet 1

INVENTORS
REUBEN THOMAS FIELDS
CARL FRITZ WALTER WOLF
BY
ATTORNEY

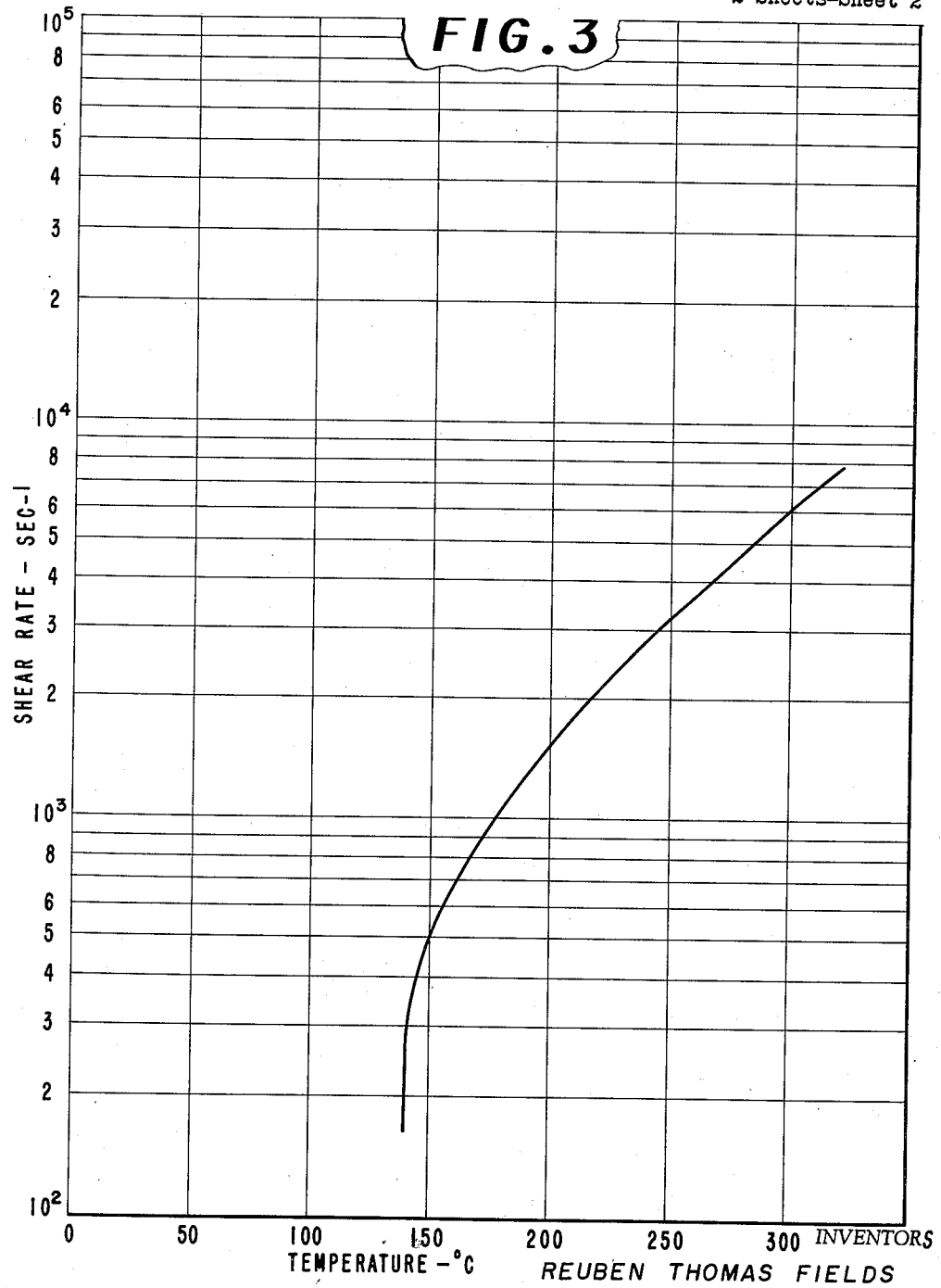

United States Patent Office 2,991,508
Patented July 11, 1961

2,991,508
FABRICATION OF THERMOPLASTIC RESINS
Reuben Thomas Fields and Carl Fritz Walter Wolf, Wilmington, Del., assignors to E. I. du Pont de Nemours and Company, Wilmington, Del., a corporation of Delaware
Filed Sept. 23, 1959, Ser. No. 841,859
5 Claims. (Cl. 18—55)

This invention relates to a new and improved method for extruding thermoplastic resins. More specifically, this invention relates to a new and improved method of extruding certain hydrocarbon and fluorocarbon resins at extremely high rates.

Extrusion of thermoplastic resins to produce useful articles is a well known art. For most applications, it is necessary that a smooth-surfaced extrudate be obtained. Films and wire coatings, for example, are generally not acceptable unless the surface is smooth. It is also generally desirable to extrude at the highest rates possible in order to achieve maximum productivity from the extrusion equipment. For many polymers, as extrusion rates are increased, a point is reached where the surface becomes very rough. Since a smooth surface is desired, the extrusion rate cannot exceed this value. This extrusion rate is referred to as the "critical extrusion rate" and the roughness is referred to as "surface fracture" or sometimes "melt fracture." Several methods are known in the art for avoiding surface fracture. A simple method is to increase the melt temperature. In general, this increases the critical extrusion rate thereby permitting extrusion of smooth-surfaced articles at higher rates. The increase in the value of the critical extrusion rate which can be achieved by increasing the temperature of the melt, is, in turn, limited by the temperature at which (1) the melt viscosity of the thermoplastic becomes so low that the extruded article will not retain the desired shape or (2) the bulk of the thermoplastic resin degrades appreciably. Heretofore, it has not been possible to exceed the critical extrusion rate at a given temperature without the formation of rough unusable product.

Some thermoplastic resins have melt flow properties such that at commercial fabricating rates the critical extrusion rate is never reached. However, recently several new types of thermoplastics have been developed which have extremely good end use properties, but have low critical extrusion rates and, thus, are difficult to fabricate at economical rates. One of these polymers is that described in U.S. 2,816,883 issued to Arthur W. Larchar and Donald C. Pease on December 17, 1957. This polymer has an annealed density of .95 to .97 and is referred to herein as "high density" polyethylene. Another polymer having a low critical extrusion rate but excellent end use properties is the fluorocarbon polymer described in Belgian Patent 560,454 granted September 14, 1957. This material is an interpolymer of tetrafluoroethylene and hexafluoropropylene containing approximately 6 to 26% by weight of hexafluoropropylene.

It is an object of this invention to provide an improved method of extruding thermoplastic resins. It is another object of this invention to provide an economical method of producing smooth-surfaced extruded articles. It is a further object of this invention to provide a method of extruding high density polyethylene at rates heretofore unattainable and obtain smooth-surfaced extruded articles thereby. It is still another object of this invention to provide a method of extruding fluorocarbon polymers at rates heretofore unattainable and obtain smooth-surfaced articles thereby. Other objects will appear hereinafter.

The objects of this invention are accomplished by a process which comprises heating to extrusion temperature a thermoplastic resin selected from the group consisting of (1) polyethylene having a density in the range of .95 to .97 g./cc. and (2) interpolymers of tetrafluoroethylene and hexafluoropropylene containing combined hexafluoropropylene in the amount of 6 to 26% by weight; forcing said resin through a die such that the rate of shear exerted on said resin as it passes through said die is in the range of 1.0 to 3.0 times the super extrusion shear rate; and recovering a smooth-surfaced article formed thereby. In accordance with the present invention, it was discovered that smooth surfaces could be obtained at rates considerably above the critical extrusion rate. As hereinbefore described, when the rate of extrusion is increased beyond the critical extrusion rate, the surface of the extrudate becomes extremely rough due to surface fracture of the melt. As the rate of extrusion is increased above the critical rate, the severity of the surface fracture generally increases. For certain polymers it was found that upon increasing the rate of extrusion far above the critical extrusion rate a smooth extrudate was obtained. This secondary transition point above the critical extrusion rate where the surface of extrudate changes from rough to smooth upon increasing the extrusion rate is referred to as the "super extrusion shear rate.' At extrusion rates above the super extrusion shear rate, the extrudate is smooth but as the extrusion rate is increased the extrudate gradually becomes rough. Above about 3.0 times the super extrusion shear rate, the extrudate is generally too rough for most applications. It is preferred to operate at an extrusion rate 1.0 to 1.5 times the super extrusion shear rate in order to achieve a very smooth and uniform surface.

Figure 1:
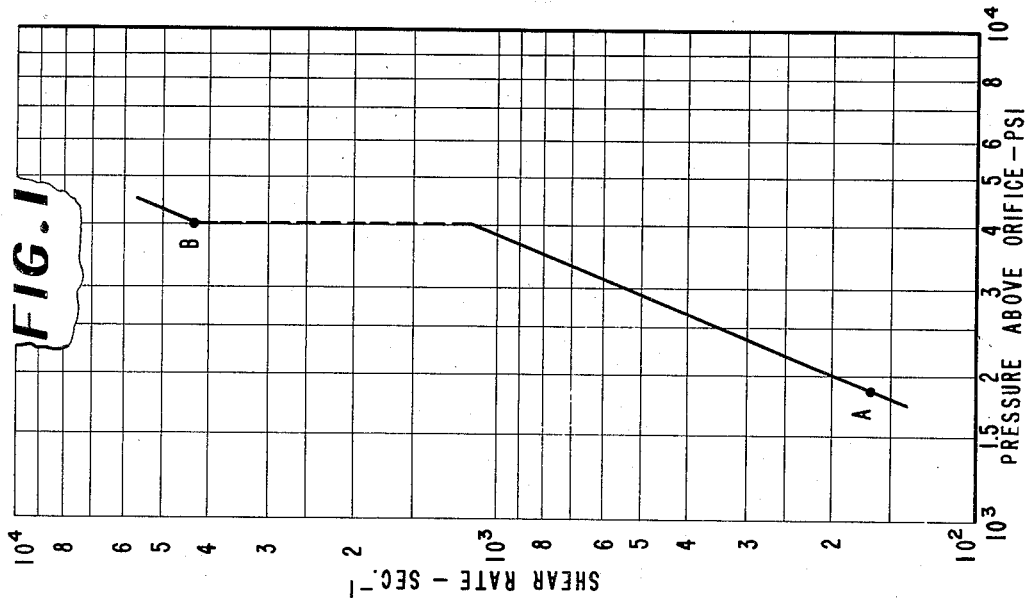

The process of the present invention is illustrated by the attached drawings in which FIGURE 1 is a plot of pressure above the orifice, i.e., extrusion pressure, against shear rate, FIGURE 2 a plot of extrusion pressure against shear rate at a temperature of 235° C. for a linear polyethylene having a melt index of 0.5 and an annealed density of 0.955 g./cc., and FIGURE 3 a plot of the super extrusion shear rate as a function of temperature for the same polyethylene.

The super extrusion shear rate can be determined for a given polymer by the method outlined hereinafter. Using a laboratory rheometer, a sample of the resin is forced through a die having a cylindrical hole, the length of the cylindrical hole being 16 times greater than the diameter of the hole, at pressures which create shear stresses up to $10^7$ dynes/cm.$^2$. Suitable equipment is described by E. B. Bagley in J. Appl. Physics, 28, 624 (1957), and by J. P. Tordella in J. Appl. Physics, 27, 454 (1956). The first measurement at the test temperatures should be made at a shear stress of $10^7$ dynes/cm.$^2$. The volumetric flow rate at this pressure is recorded. Subsequent measurements should be made at decreasing pressures. Preferably, the pressure is reduced by decrements of 20% of the previous pressure. However, it is important that at the start of a measurement, the pressure is first raised to the level of the previous measurement and then reduced to the desired pressure at which the steady state flow rate of the polymer is recorded. At a certain pressure the flow rate of the extrudate decreases considerably when the pressure is reduced by a small decrement. The super extrusion shear rate is determined from a plot of the logarithm of the pressure versus the logarithm of the shear rate, where shear rate is calculated from the determined volumetric flow rate by the equation:

$$\gamma = \frac{32q}{\pi D^3}$$

where $\gamma$ is the shear rate, $q$ is the volumetric flow rate and D is the die orifice diameter. FIGURE 1 is an illustration of a plot prepared from such data. The point where there is a substantial drop in the shear rate corresponding to a substantial drop in the flow rate of the polymer is the super extrusion shear rate and is denoted by point B in FIGURE 1. Point A is the critical extrusion rate. If desired, a series of the above tests can be made at various temperatures from which the temperature function of the super extrusion shear rate can be determined. The usefulness of such information will be described hereinafter.

When the super extrusion shear rate is known, operating conditions for any extruder can be easily calculated. For circular die orifices the flow rate at the super extrusion shear rate is determined from the following equation:

$$q^1 = \frac{\gamma^1 \pi D^3}{32}$$

where $\gamma^1$ is the super extrusion shear rate and D is the die orifice diameter. As described hereinbefore, the preferred range of operation is 1.0 to 1.5 times the super extrusion shear rate. The preferred flow rate is likewise 1.0 to 1.5 times the super extrusion flow rate. The operating conditions necessary to obtain a given volumetric flow rate at a given temperature for a given polymer and extruder can be easily achieved by adjustment of screw speed on the extruder and the extruder barrel temperature.

Since the super extrusion shear rate is a function of temperature, one would expect that the volumetric flow rate corresponding to the super extrusion shear rate would be a function of melt temperature. Surprisingly, this is not the case. The volumetric flow rate necessary to obtain the super extrusion shear rate is a function only of die temperature, i.e., a variation in the die temperature will cause a corresponding variation in the super extrusion flow rate as predicted by the temperature function of the super extrusion shear rate. Likewise, at a constant die temperature, the super extrusion flow rate will remain constant even when the melt temperature is varied. This holds true even for major variations in the melt temperature. Therefore, as a practical matter, it is desirable to provide a means for both heating and cooling the extrusion die in order to maintain maximum control over the super extrusion shear rate.

The term "melt temperature" means the average bulk temperature of the melt just before it passes through the die. The term "extrusion temperature" defines that range of temperature at which a uniformly heated thermoplastic resin can be extruded without any apparent bulk decomposition. The upper limit of the extrusion temperature will vary with each thermoplastic material, depending on the thermal stability of the resin. The lower limit of the extrusion temperature is generally the softening point of the resin at which the material becomes a viscous liquid.

All density values referred to herein are annealed densities unless otherwise specified. Any of the annealing procedures well known in the art may be used. Melt viscosities used herein were determined by the method set forth in Belgian Patent 560,454 granted September 14, 1957.

Unless otherwise specified, all parts and percentages used herein are by weight.

To further illustrate the various aspects of the present invention, preferred embodiments thereof, and the advantageous results to be obtained thereby, the following examples are included.

*Example I*

Linear polyethylene having a melt index (ASTM–D–1238–57–T) of 0.5 and an annealed density of .955 g./cc. was extruded into beading through a 1/8" circular die having a 0.6" land and 77° included inlet angle using a 2" extruder made by the Hartig Engine and Machine Company.

The super extrusion shear rate was determined for this polymer using the method hereinbefore described. FIGURE 2 is a plot of log shear rate versus log pressure for this polymer at 235° C., the super extrusion shear rate at 235° C. is 2500 sec.$^{-1}$. This shear rate occurs at a pressure of 2600 p.s.i. FIGURE 3 is a plot of the super extrusion shear rate as a function of temperature for this polymer. With the melt and the die at 235° C., extrusion was started at a rate of 1 lb. per hour and the rate slowly increased. At low rates, the surface was smooth indicating operation below the critical shear rate. When the extrusion rate reached 3 lbs./hour, the surface became very rough indicating that surface fracture was occurring. A further increase in the extrusion rate resulted in a more pronounced surface fracture. When the extrusion rate was increased to 45.0 lbs./hour, the extrudate became very smooth indicating the super extrusion shear rate had been attained. An extrusion rate of 45 lbs./hour is equivalent to a shear rate of 2530 sec.$^{-1}$. At an extrusion rate of 90 lbs./hour, the extrudate was still smooth. As the extrusion rate was increased still further, the surface gradually became rougher until at approximately 140 lbs./hour the surface was too rough to be acceptable for most purposes. In this example, smooth extrudates were obtained at rates more than fifteen times those heretofore attainable with this polymer.

While operating at 140 lbs./hour and a melt temperature of about 235° C., the die temperature was increased to 300° C., which in turn, increased the super extrusion shear rate to 6200 sec.$^{-1}$, which is equivalent to an extrusion rate of 110 lbs./hour. This increase in die temperature caused the surface of the extrudate to become smooth.

While maintaining the melt temperature at 235° C., the die temperature was then decreased to 175° C. which decreased the super extrusion shear rate to about 1000 sec.$^{-1}$ corresponding to an extrusion rate of about 17.8 lbs./hour. As the extrusion rate was decreased from 150 lbs./hour, the surface changed from rough to smooth at about 50 lbs./hour. A further decrease caused the smoothness of the extrudate to increase until at about 20 lbs./hour the extrudate was very smooth. A change in the extrusion rate to less than 15 lbs./hour caused the surface to again become rough indicating surface fracture was occurring.

*Example II*

Using substantially the same equipment and procedure as in Example I, a 3/32" beading of an interpolymer of hexafluoropropylene and tetrafluoroethylene was extruded through a circular die having a 0.60" land and 77° included inlet angle. This interpolymer contained 15 weight percent of hexafluoropropylene, having a melt viscosity of $7.2 \times 10^4$ poises and a super extrusion shear rate of 175 sec.$^{-1}$, 590 sec.$^{-1}$ and 1200 sec.$^{-1}$ at a die temperature of 335° C., 360° C. and 375° C., respectively. Extrusion was carried out at 5.9 lbs./hour, which corresponded to a shear rate of 350 sec.$^{-1}$, with the die temperature and melt temperature maintained at 360° C. The extrudate was extremely rough indicating surface fracture was occurring. The extrusion rate was increased to 10.8 lbs./hour, corresponding to a shear rate of 640 sec.$^{-1}$, whereupon the extrudate became smooth. Extrusion at 32.0 lbs./hour (shear rate of 1900 sec.$^{-1}$) gave an extrudate which was too lumpy for most applications. By increasing the die temperature to 375° C., the extrudate again became smooth at the same shear rate. In general, the extrudate obtained at rates just above the super extrusion shear rate were superior in smoothness to those obtained at higher rates.

Substantially the same results are obtained as in the foregoing examples by extruding any polyethylene having an annealed density in the range of .95 to .97 and a melt index of less than 6 as determined by ASTM–D–1238–57–T or a hexafluoropropylene-tetrafluoroethylene interpolymer containing from 6 to 26 weight percent of hexafluoropropylene and having a melt viscosity of $1.5 \times 10^4$ to $1 \times 10^6$ poises as measured at 380° C. under a shear stress of 6.5 p.s.i.

The foregoing examples are merely illustrations of certain embodiments of the invention, and are not to be construed as limitations thereof.

Dies having shapes other than circular, may be used if desired. It is only necessary that calculations be made to determine the proper extrusion rate from the super extrusion shear rate. Such calculations are well known to those skilled in the art. If desired, the proper extrusion rate can also be determined experimentally.

In a preferred embodiment of this invention, the extrusion is carried out through a die having a land length of at least 1.0 times the smallest dimension of the die orifice. Most preferably, a die is used having a land length to diameter ratio of 3:1 to 16:1. It is likewise preferred to use a die having a tapered inlet angle. Included inlet angles from 30° to 100° are preferred.

Best results are obtained in the practice of this invention when the melt temperature is about 100° C. or more above the crystalline melting point of the polymer. This is particularly true when the polymer is of high viscosity.

The process of the present invention is useful in fabricating articles such as tubes, rods, pipes, monofilaments, blown film, flat film, sheeting and the like and for coating articles such as wire, cloth, paper, screen, cardboard and the like.

In general, the process is useful whenever it is desired to produce smooth-surfaced articles at high speeds. The process of the present invention permits a fabricator to operate his extrusion machines faster and over a wider range of conditions. The process is especially advantageous, since it permits obtaining much greater productivity from given equipment with little or no modifications to the equipment.

We claim:

1. A process for producing smooth-surfaced extruded articles which comprises heating to its extrusion temperature a thermoplastic resin selected from the group consisting of (1) a normally solid ethylene polymer having an annealed density in the range of .95 to .97 and a melt index of less than 6, as determined by ASTM-D-1238-57-T, and (2) an interpolymer of tetrafluoroethylene and hexafluoropropylene containing 6 to 26% by weight of combined hexafluoropropylene and having a melt viscosity of $1.5 \times 10^4$ to $1 \times 10^6$ poises as measured at 380° C. under a shear stress of 6.5 p.s.i.; forcing said resin through a die such that the rate of shear exerted on said resin is in the range of 1.0 to 3.0 times the super extrusion shear rate as hereinabove defined; and recovering a smooth-surfaced article formed thereby.

2. A process for producing smooth-surfaced articles which comprises heating to its extrusion temperature a normally solid ethylene polymer having an annealed density of .95 to .97 and a melt index of less than 6 as determined by ASTM-D-1238-57-T; forcing said polymer through a die such that the rate of shear exerted on said polymer as it passes through said die is in the range of 1.0 to 1.5 times the super extrusion shear rate as hereinabove defined; and recovering a smooth-surfaced article formed thereby.

3. The process of claim 2 wherein the die has a land length of at least 1.0 times the smallest dimension of the die orifice.

4. A process for producing smooth surfaced extruded articles which comprises heating to its extrusion temperature an interpolymer of tetrafluoroethylene and hexafluoropropylene containing 6 to 26% by weight of combined hexafluoropropylene and having a melt viscosity $1.5 \times 10^4$ to $1 \times 10^6$ poises as measured at 380° C. under a shear stress of 6.5 p.s.i., forcing said interpolymer through a die such that the rate of shear exerted on said interpolymer as it passes through said die is in the range of 1.0 to 1.5 times the super extrusion shear rate as hereinabove defined, and recovering a smooth-surfaced article formed thereby.

5. The process of claim 4 wherein the die has a land length of at least 1.0 times the smallest dimension of the die orifice.

References Cited in the file of this patent

UNITED STATES PATENTS

| | | |
|---|---|---|
| 2,698,463 | Conwell et al. | Jan. 4, 1955 |
| 2,736,064 | Rubin | Feb. 28, 1956 |
| 2,762,791 | Pease et al. | Sept. 11, 1956 |